Patented Mar. 9, 1926.

1,576,045

UNITED STATES PATENT OFFICE.

FRED E. GREENE, OF BERKELEY, CALIFORNIA.

PAVING MATERIAL AND METHOD OF PREPARING SAME.

No Drawing. Application filed September 21, 1921. Serial No. 502,239.

*To all whom it may concern:*

Be it known that I, FRED E. GREENE, a citizen of the United States, residing at Berkeley, in the county of Alameda and State of California, have invented new and useful Improvements in Paving Materials and Methods of Preparing Same, of which the following is a specification.

This invention relates to paving material and a method of preparing the same. The object is to produce a paving material of improved wearing qualities.

In prior paving materials, even those employing the best ingredients, no particular attention is paid to the matter of heating or cooking the ingredients when mixing the same, or to the temperature at which the mixture is laid. As a consequence, the ingredients do not combine as they should and numerous voids occur throughout, which soon result in irregularities in the surface of the pavement. These irregularities, under the force of blows imparted by passing vehicles, soon cause the pavement to roll or creep, resulting in early deterioration of the entire structure. By properly proportioning the ingredients and mixing them under high temperature, and cooking the mixture, and laying the same while still hot, I have succeeded in eliminating all objectionable voids and have produced a paving material which will not roll, creep, peel, crack, or otherwise disintegrate under the most severe conditions of use.

The ingredients which I employ consist of asphalt, 3 to 20 percent, aggregate 50 to 89 percent. limestone 8 to 30 percent. The asphalt should be steam refined and have a penetration range of from 20 to 60 degrees. The aggregate should consist of sand and gravel or sand and crushed rock, or sand alone. The limestone should be ground to pass through a 200 mesh screen.

The asphalt is first heated and maintained at a temperature of from 250 to 300 degrees Fahrenheit. Also the aggregate is given a preliminary heating and the limestone is added to the aggregate while the latter is still hot. This mixture of limestone and aggregate in the proper proportions is then added to the hot asphalt and the whole is mixed and cooked, being kept at a temperature of from 300 to 600 degrees Fahrenheit for a period of from 5 to 25 minutes. The final product is laid while still at a temperature of 300 degrees Fahrenheit or over. It is not necessary to apply any considerable pressure to the material when laying the same, except as may be necessary to iron out any irregularities. This material can be laid as thin as one-fourth of an inch if desired, inasmuch as the ingredients are intimately combined and all objectionable voids have been eliminated.

While ordinary asphalt has been known to flash at a temperature of 520 degrees Fahrenheit, I find that asphalt having the penetration range named herein, when mixed with limestone, will not flash at temperatures as high as 600 degrees Fahrenheit.

The drum in which the ingredients are mixed and cooked should preferably have an opening to admit air, such opening being about 8 inches in diameter for a drum 8 feet long and 5 feet in diameter.

The product of this invention possesses increased durability, due to the fact that the asphalt which forms the binder has been toughened by the cooking process. Asphalt which has merely been heated to facilitate mixing, as is done in prior processes, does not possess the same lasting qualities. This paving material is malleable, elastic and homogeneous to such an extent that it will heal itself under traffic if cut with a sharp wheel or instrument.

Having thus described my invention, what I claim and desire to secure by Letters Patent is:

1. A paving material consisting of steam-refined asphalt, a filler of aggregate which has been pre-heated, and limestone, the latter in excess of the asphaltic constituent, the whole being mixed together and cooked under a temperature of from 300° to 600° F. for a period ranging from five to twenty-five minutes.

2. A method of forming paving material which consists in employing steam-refined asphalt heated to a temperature of from 250° to 300° F., adding thereto aggregate and limestone, the latter in excess of the asphaltic constituent, and agitating and cooking the mixture at a temperature of from 300° to 600° F.

3. A method of forming paving material which consists in employing steam-refined asphalt heated to a temperature of from 250° to 300° F., adding thereto aggregate and limestone, the latter in excess of the asphaltic constituent, and agitating and cooking the mixture at a temperature of from 300° to 600° F. for a period ranging from five to twenty-five minutes.

FRED E. GREENE.